(12) United States Patent
Gharia

(10) Patent No.: US 10,430,534 B2
(45) Date of Patent: Oct. 1, 2019

(54) RESISTANCE-BASED MEMORY COMPILER

(71) Applicant: NUMEM INC., Sunnyvale, CA (US)

(72) Inventor: Nilesh A. Gharia, Morgan Hill, CA (US)

(73) Assignee: NUMEM INC., Sunnyvale, CA (US)

( * ) Notice: Subject to any disclaimer, the term of this patent is extended or adjusted under 35 U.S.C. 154(b) by 11 days.

(21) Appl. No.: 15/826,597

(22) Filed: Nov. 29, 2017

(65) Prior Publication Data

US 2018/0150576 A1 May 31, 2018

Related U.S. Application Data

(60) Provisional application No. 62/428,375, filed on Nov. 30, 2016.

(51) Int. Cl.
| | |
|---|---|
| *G06F 17/50* | (2006.01) |
| *G01R 31/317* | (2006.01) |
| *G11C 13/00* | (2006.01) |
| *G11C 11/16* | (2006.01) |
| *G11C 11/56* | (2006.01) |

(52) U.S. Cl.
CPC ... *G06F 17/5022* (2013.01); *G01R 31/31703* (2013.01); *G11C 11/1673* (2013.01); *G11C 11/1675* (2013.01); *G11C 11/5607* (2013.01); *G11C 11/5678* (2013.01); *G11C 13/004* (2013.01); *G11C 13/0038* (2013.01); *G11C 13/0061* (2013.01); *G11C 13/0069* (2013.01); *G06F 2217/02* (2013.01); *G06F 2217/06* (2013.01); *G11C 2013/0045* (2013.01); *G11C 2013/0054* (2013.01); *G11C 2013/0092* (2013.01); *G11C 2213/79* (2013.01)

(58) Field of Classification Search
CPC .......................... G11C 13/004; G11C 13/0069
USPC .................................................. 716/102–103
See application file for complete search history.

(56) References Cited

U.S. PATENT DOCUMENTS

| | | | |
|---|---|---|---|
| 6,055,178 A | 4/2000 | Naji | |
| 7,453,719 B2 | 11/2008 | Sakimura et al. | |
| 8,437,171 B1 | 5/2013 | Gilbert | |
| 9,659,624 B1 | 5/2017 | Hendrickson et al. | |
| 2005/0105334 A1 | 5/2005 | Futatsuyama | |
| 2005/0138580 A1* | 6/2005 | Lim | G06F 17/5045 716/103 |
| 2006/0190862 A1 | 8/2006 | Lee et al. | |
| 2009/0010052 A1 | 1/2009 | Kang et al. | |
| 2009/0027953 A1 | 1/2009 | Kang et al. | |
| 2009/0268515 A1 | 10/2009 | Jeong et al. | |

(Continued)

FOREIGN PATENT DOCUMENTS

| | | |
|---|---|---|
| DE | 10 2006 060 257 B4 | 9/2010 |
| WO | 2016/068911 A1 | 5/2016 |
| WO | 2018/102557 A1 | 6/2018 |

OTHER PUBLICATIONS

U.S. Appl. No. 16/179,739, filed Nov. 18, 2018 (27 pgs.).

(Continued)

*Primary Examiner* — Paul Dinh
(74) *Attorney, Agent, or Firm* — Paradice and Li LLP

(57) ABSTRACT

Systems, methods and devices are disclosed that may a user to specify various layout and operational parameters of a resistive-based memory array in a manner that accommodates the unique characteristics of resistance-based memory cells and magnetic-based memory cells.

13 Claims, 11 Drawing Sheets

(56) References Cited

U.S. PATENT DOCUMENTS

| | | |
|---|---|---|
| 2010/0118588 A1 | 5/2010 | Chen et al. |
| 2012/0131523 A1* | 5/2012 | Lu ................ G06F 17/5022 |
| | | 716/102 |
| 2013/0265820 A1 | 10/2013 | Chih et al. |
| 2014/0269124 A1 | 9/2014 | Seningen et al. |
| 2015/0286762 A1 | 10/2015 | Sato et al. |
| 2016/0019943 A1 | 1/2016 | Chih et al. |
| 2016/0365129 A1 | 12/2016 | Willcock |
| 2017/0337308 A1* | 11/2017 | Rotenberg .......... G06F 17/5022 |
| 2018/0032655 A1 | 2/2018 | Levi et al. |

OTHER PUBLICATIONS

International Search Report and Written Opinion for PCT/UIS2018/059076 dated Jan. 17, 2019 (10 Pages).
International Search Report and Written Opinion for PCT/UIS2017/063969 dated Mar. 28, 2018 (12 Pages).
U.S. Appl. No. 16/424,320, filed May 28, 2019 (39 pgs.).

* cited by examiner

RESISTANCE-BASED MEMORY COMPILER

CROSS-REFERENCE TO RELATED APPLICATIONS

This Patent Application claims priority to U.S. Provisional Patent Application No. 62/428,375 entitled "Resistive memory compiler" filed on Nov. 30, 2016, which is assigned to the assignee hereof. The disclosure of the prior Application is considered part of and are incorporated by reference in this Patent Application.

TECHNICAL FIELD

The present disclosure relates generally to memory arrays, and more specifically to a method of generating one or more design files to implement resistance-based memory arrays using a compiler-based work flow.

BACKGROUND

Magnetic random access memory (MRAM) devices are being developed as an alternative to conventional semiconductor memory devices for many applications including information storage, wireless and wireline communications, and/or information processing. MRAM devices provide persistent (non-volatile) storage with relatively high densities.

MRAM memory cells represent stored data as different resistance values, and are often referred to as resistance-based memory cells because the logic state of data stored therein may be determined by measuring the resistance value of the MRAM memory cell. Example resistance-based memory cells may include, but are not limited to, spin-transfer-torque (STT) memory cells, spin-orbit-torque (SOT) memory cells, resistor random access memory (Re-RAM), phase charge RAM, and/or carbon nanotube memory cells. By way of example, STT memory cells may store different logic states of data by changing the equivalent resistance of magnetic tunnel junction (MTJ) elements. During write operations, data may be programmed into a resistance-based memory cell by varying a current and/or a voltage driven through the memory cell, for example, to program the resistance-based memory cell to either a high impedance value or a low impedance value. During read operations, a controlled current may be driven through the resistance-based memory cell to determine an impedance value indicative of the logic state of data stored therein.

Electronic design automation (EDA) tools for designing conventional memories may include compilers and/or synthesis tools, which enable a user to specify parameters of the memory and to generate related design files. However, such EDA tools may be unable to accommodate the unique characteristics of magnetic and/or resistance-based memory cells. For one example, process variations inherent in the manufacture of semiconductor devices may cause resistance-based memory cells formed in different portions of a silicon wafer or die to have different equivalent resistances (such as before data is stored therein). For another example, temperature variations may cause uneven variations in equivalent resistances of resistance-based memory cells located in different portions of a memory array. Because resistance-based memory cells store data in terms of resistance, variations in equivalent resistances between the resistance-based memory cells in a memory array may cause erroneous data to be retrieved from the memory array during read operations.

Thus, it would be desirable for an EDA tool that can compensate for different resistance characteristics of resistance-based memory cells in a memory array.

SUMMARY

The systems, methods and devices of this disclosure each have several innovative aspects, no single one of which is solely responsible for the desirable attributes disclosed herein.

One innovative aspect of the subject matter described in this disclosure can be implemented as a method for calibrating a write operation of a memory array including a plurality of resistance-based memory cells. The method may include generating an initial write voltage; writing a first test data to a selected RBM cell by applying the initial write voltage to a word line associated with the selected RBM cell for a time period; reading data stored in the selected RBM cell; comparing the stored data with the first test data; and selectively adjusting at least one of the write voltage and the time period based on the comparison. The time period may correspond to a pulse width of the write voltage. In some implementations, if the stored data does not match the first test data, the write voltage may be adjusted, the time period may be adjusted, or both. The method may also include generating a reference voltage; reading the test data stored in the selected RBM cell; comparing the read test data with known data; and adjusting the reference voltage if the first test data read from the RBM cell does not match the known data.

Another innovative aspect of the subject matter described in this disclosure can be implemented as a non-transitory computer-readable storage medium. The non-transitory computer-readable storage medium may store instructions that, when executed by one or more processors of a computer system, cause the computer system to generate, based on user input, one or more netlist files for configuring a memory array by performing a number of operations. The number of operations may include providing a memory block including a controller, a number of reference voltage generators, a number of sense amplifiers, and a number of memory columns each including a plurality of resistance-based memory (RBM) cells; selecting the number of reference voltage generators to include in the memory block based on the user input; selecting the number of sense amplifiers to include in the memory block based on the user input; and determining how many of the sense amplifiers are to be coupled to each of the reference voltage generators based on the user input. In some implementations, a first netlist file configuration provides a single reference voltage generator for all the sense amplifiers in the memory block; a second netlist file configuration provides a different reference voltage generator for a selected number of the sense amplifiers in the memory block; and a third netlist file configuration provides a dedicated reference voltage generator for each of the sense amplifiers in the memory block.

Execution of the instructions may cause the computer system to perform operations further comprising providing a column bias circuit for the memory block; selecting a number of programmable current sources to include in the column bias circuit based on the user input; and determining how many of the memory columns are to be coupled to each of the programmable current sources based on the user input. In some implementations, a first netlist file configuration provides a single programmable current source for all the memory columns in the memory block; a second netlist file configuration provides a different programmable current source for a selected number of the memory columns in the memory block; and a third netlist file configuration provides a dedicated programmable current source for each of the memory columns in the memory block.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
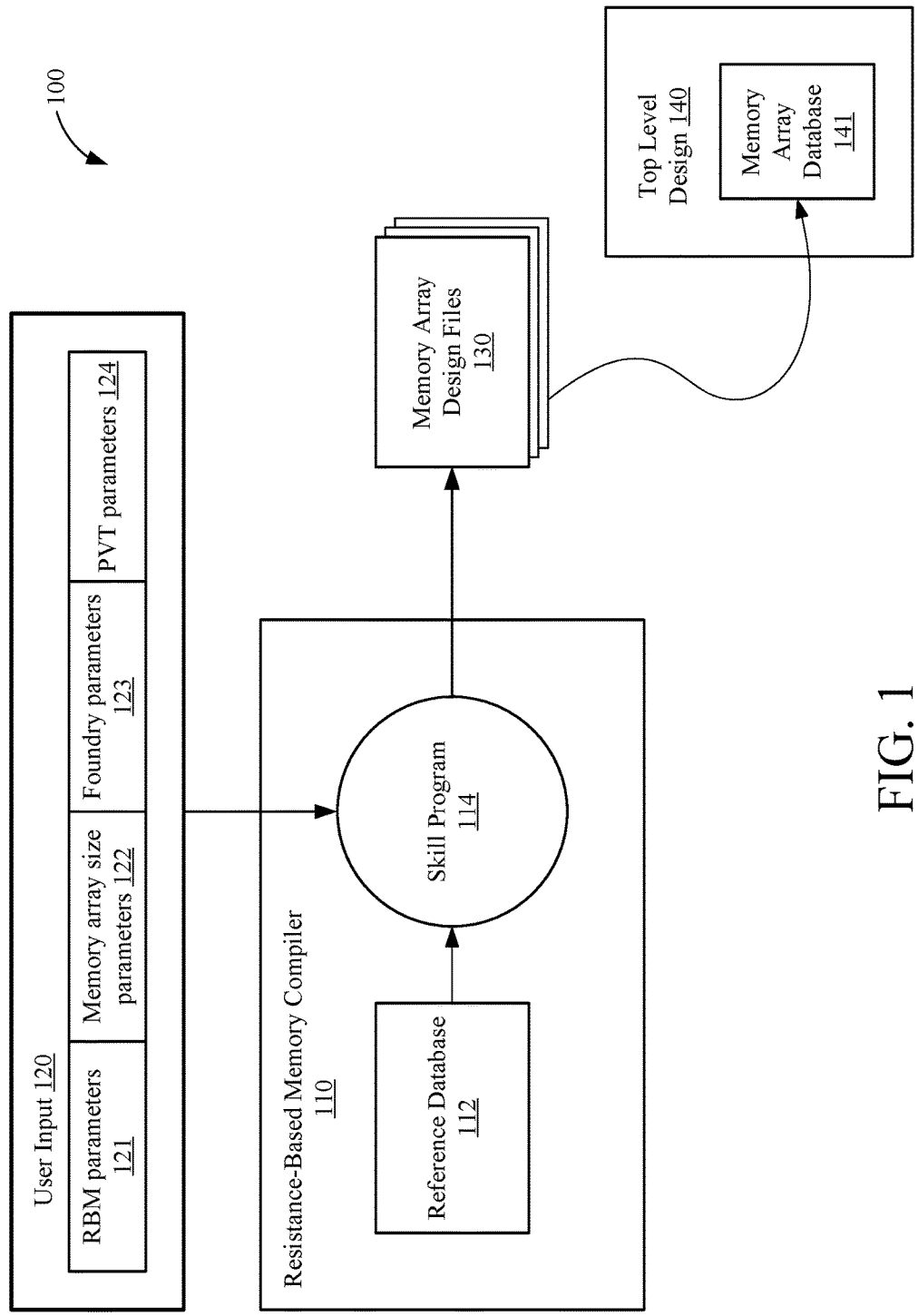
FIG. 1 depicts a conceptual diagram within which the example embodiments may be implemented.

In the following description, numerous specific details are set forth such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the example implementations. In other instances, well-known circuits and devices are shown in block diagram form to avoid obscuring the present disclosure. The present disclosure is not to be construed as limited to specific examples described herein but rather to include within their scopes all implementations defined by the appended claims.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented, or a method may be practiced using any number of the aspects set forth herein. In addition, the scope of the disclosure is intended to cover such an apparatus or method, which is practiced using other structure, functionality, or structure and functionality in addition to or other than the various aspects of the disclosure set forth herein. It should be understood that any aspect of the disclosure disclosed herein may be embodied by one or more elements of a claim. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Also, "determining" may include measuring, estimating, and the like.

As used herein, the term "generating" encompasses a wide variety of actions. For example, "generating" may include calculating, causing, computing, creating, determining, processing, deriving, investigating, making, producing, providing, giving rise to, leading to, resulting in, looking up (e.g., looking up in a table, a database or another data structure), ascertaining and the like. Also, "generating" may include receiving (e.g., receiving information), accessing (e.g., accessing data in a memory) and the like. Also, "generating" may include resolving, selecting, choosing, establishing and the like.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any such list including multiples of the same members (e.g., any lists that include aa, bb, or cc).

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

FIG. 1 depicts a conceptual diagram 100 within which the example embodiments may be implemented. The diagram 100 shows a resistance-based memory compiler 110 receiving user input 120 and generating memory array design files 130. The resistance-based memory compiler 110 may include a reference database 112 and a skill program 114. The reference database 112 may include one or more databases describing one or more unique resistance-based memory architectures. For example, the reference database 112 may include files describing a spin-transfer-torque (STT) memory array, spin-orbit-torque (SOT) memory array, and/or carbon nanotube memory structure (e.g., files for one or more technology dependent arrangement of bit cells, sense amplifiers (amps), multiplexers, etc.). Although only three types of resistance-based memory architectures are described herein, any other suitable memory architecture may be stored within the reference database 112.

The skill program 114 may generate the memory array design files 130 based on the reference database 112 and the user input 120. The user input 120 may include one or more parameters to guide the resistance-based memory (RBM) compiler 110 during the generation of the memory array design files 130. For example, the user input 120 may include RBM parameters 121, memory array size parameters 122, foundry parameters 123, and process-voltage-temperature (PVT) parameters 124. RBM parameters 121 may include information regarding characteristics associated with a particular resistance-based memory. For example, RBM parameters 121 may include characteristics associated with STT memory arrays, SOT memory arrays, resistor RAM arrays, phase RAM arrays, carbon nanotube memory arrays, or any other technically feasible resistance-based memory array. Memory array size parameters 122 may include word size (e.g., a number of bits per word), memory array depth (e.g., a number of words), memory columns per multiplexer (mux), memory tiling information, and/or a number of memory array blocks to be included within each memory array. Foundry parameters 123 may include information (e.g., libraries) provided by a foundry that includes foundry specific information associated with one or more types of resistance-based memories. PVT parameters 124 may include process, voltage, and/or temperature design parameters that may be used during the generation of the memory array design files 130. Although only four user input parameters are described herein, in other embodiments, the user input 120 may include any number of technically feasible user input parameters.

The memory array design files 130 may include one or more output files. In some aspects, the output files may include register transfer language (RTL) files that may be used to verify memory functionality, simulate the associated array, and/or perform timing analysis. In addition, the output files may include database files that may be used for physical layout of the associated memory array.

A resistive-based memory array (determined by and/or included within the memory array design files 130) may be instantiated in a top level design 140. For example, a memory array database 141 (e.g., a file included within the memory array design files 130) may be included within the top level design 140. The top level design 140 may be any suitable design that includes a non-volatile and/or a resistive-based memory array. Examples of the top level design 140 may include an application specific processor, a network device, and/or a non-volatile cache memory.

Figure 2:
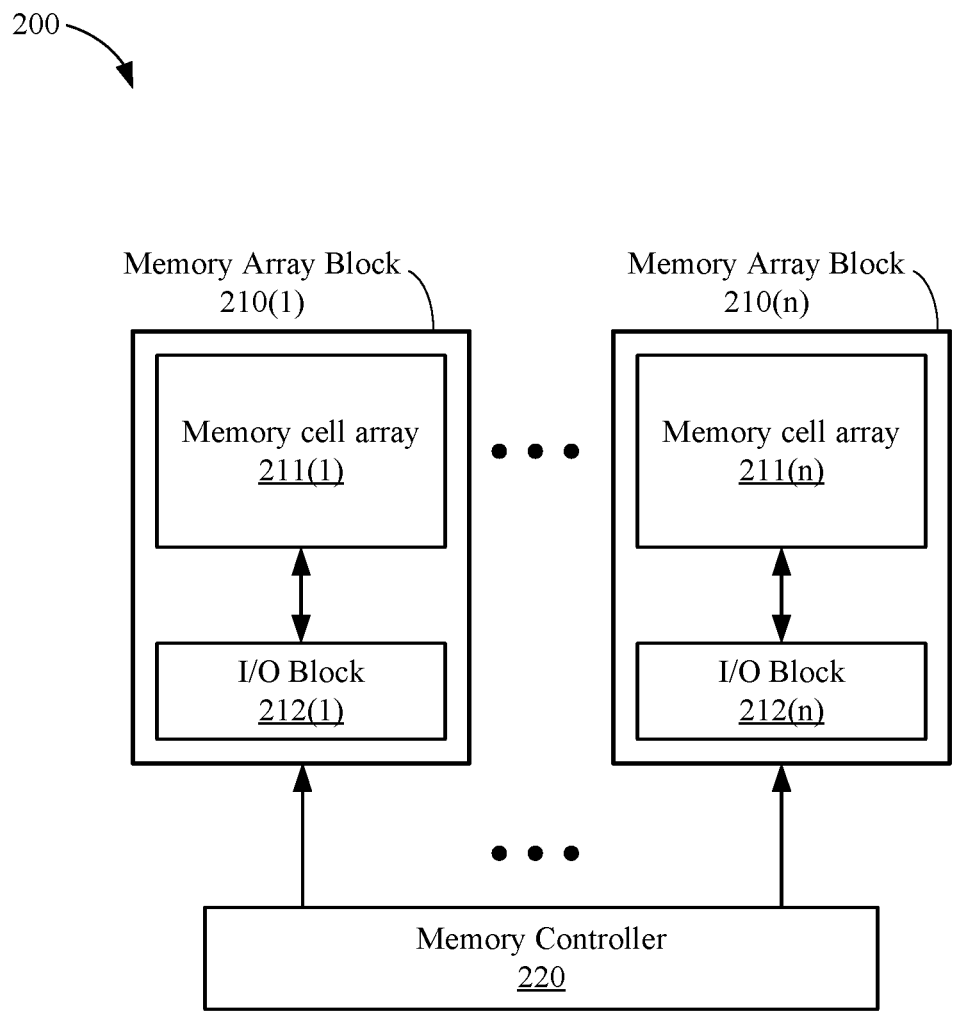
FIG. 2 shows a block diagram of an example resistance-based memory array.

FIG. 2 shows a block diagram of an example resistance-based memory array 200. The resistance-based memory array 200 may include a number n of memory array blocks (e.g., memory array block 210(1)-memory array block 210(n)) and a memory controller 220. In some embodiments, the resistance-based memory array 200 may be divided into two or more regions (also referred to as tiles) based on a memory size (e.g., word width and depth) and tiling information provided by the user through the user input 120. Each memory array block 210(1)-210(n) may include a memory cell array and an input/output (I/O) block. Thus, memory array blocks 210(1)-210(n) may include memory cell arrays 211(1)-211(n) and I/O blocks 212(1)-212(n), respectively. The memory cell arrays 211(1)-211(n) may include one or more resistance-based memory cells (sometimes referred to as resistive bit cells or RBM cells, not shown for simplicity). In some aspects, memory controller 220 may generate word line, select line, and/or bit line control signals to enable read/write access to specific memory cells within the memory cell arrays 211(1)-211(n).

The I/O blocks 212(1)-212(n) may include circuitry to receive data for writing into the memory cell arrays 211(1)-211(n), and may include circuitry to read data from the memory cell arrays 211(1)-211(n). In some aspects, the I/O blocks 212(1)-212(n) may include circuitry (not shown for simplicity) to provide one or more bias voltages and/or currents to the memory cell arrays 211(1)-211(n), respectively. Furthermore, the I/O blocks 212(1)-212(n) may include one or more sense amplifiers (not shown for simplicity) to sense voltages associated with selected memory cells during read operations, for example, to determine whether a logic 0 or logic 1 is stored in each of the selected memory cells. The resistance values associated with the selected memory cells, which may indicate the logic state of data stored therein, may be derived from the sensed voltages. In some embodiments, portions of a memory array block may be arranged in columns to improve area usage and/or share circuit resources. The selection and operation of bias voltages, bias currents, sense amplifiers, and memory columns are described in more detail below in conjunction with FIG. 3.

Figure 3:
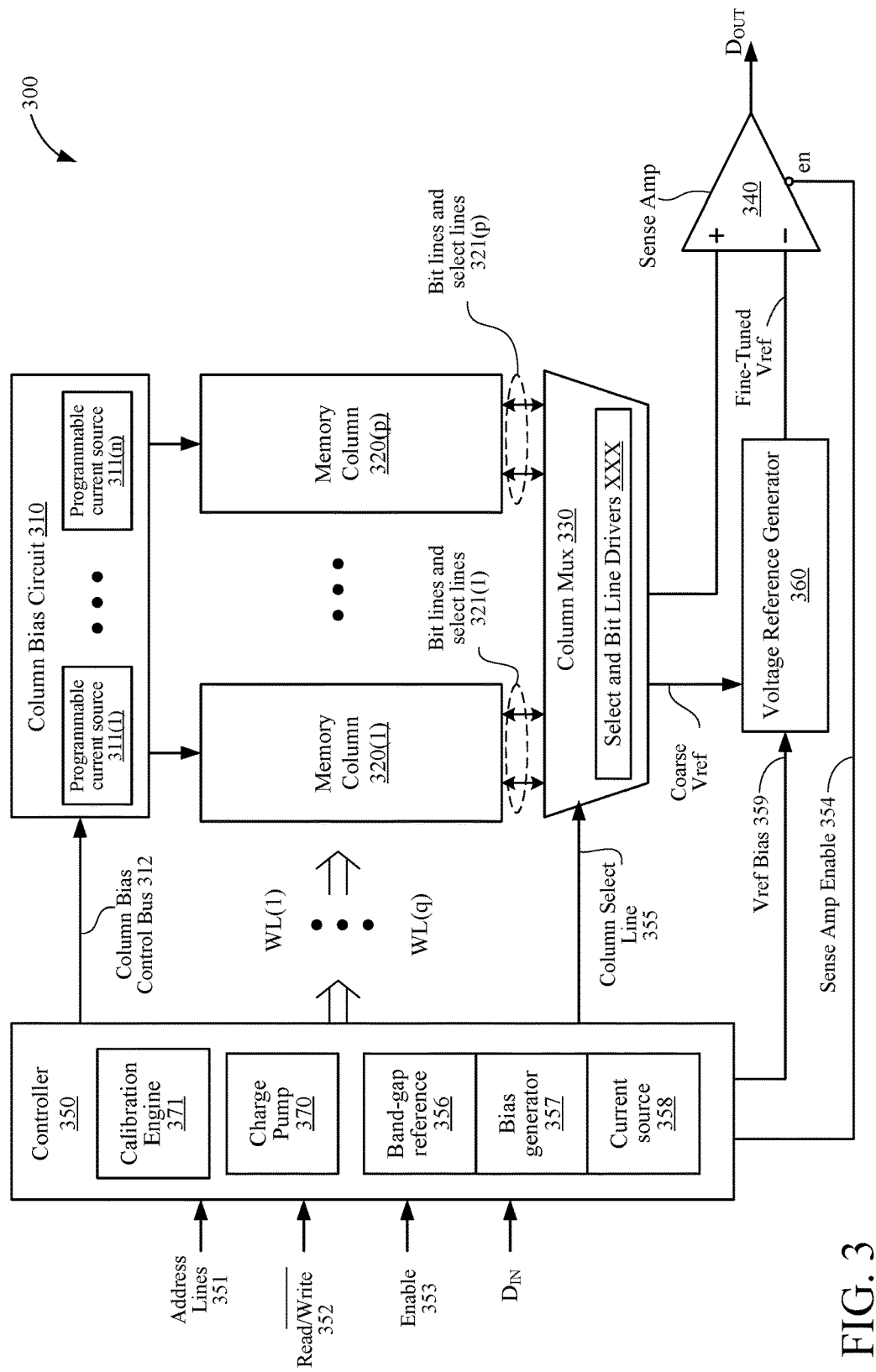
FIG. 3 shows a block diagram of an example memory array block.

FIG. 3 shows a block diagram of an example memory array block 300. The memory array block 300 may be an embodiment of the memory array blocks 210(1)-210(n) of FIG. 2. The memory array block 300 may include column bias circuits 310, memory columns 320(1)-320(p), a column multiplexer (mux) 330, a sense amp 340, a controller 350, and a reference voltage generator 360. The column bias circuits 310 may include or be coupled to a plurality of programmable current sources 311(1)-311(n) to provide current to the memory columns 320(1)-320(p). In some embodiments, each memory column 320(1)-320(p) may be coupled to a dedicated (e.g., independent) one of the programmable current sources 311(1)-311(n) within the column bias circuits 310. The controller 350 may include a band-gap reference 356, a bias generator 357, and a current source 358 that, together or in part, may generate a Vref Bias 359 for the reference voltage generator 360. The controller 350 may also include a charge pump 370 and a calibration engine 371.

The controller 350 may control read and write operations associated with the memory columns 320(1)-320(p). In some aspects, the controller 350 may be coupled to a plurality of address lines 351, and may be configured to receive a read/write signal 352, an enable signal 353, and (when appropriate) input data $D_{IN}$. The address lines 351 may select one or more of the RBM cells (within a selected memory column 320(1)-320(p), not shown for simplicity) for read and write operations. In some aspects, the address lines 351 may be decoded into a number q of word lines (e.g., WL(1)-WL(q)) and a number p of column select lines. The word lines WL(1)-WL(q) may be coupled to appropriate RBM cells across the memory columns 320(1)-320(p).

Some RBM cells may require different word line voltages and/or pulse widths for read and write operations. For example, word line voltages for write operations may be higher than word line voltages for read operations. In a similar manner, a word line pulse width for a write operation may be longer than a word line pulse width for a read operation. As used herein, a word line pulse width may refer to a time period during which a write voltage is applied to a word line during write operations, and may also refer to a time period during which a read voltage is applied to a word line during read operations. The controller 350 may include a charge pump 370 to generate different word line voltages, and may include a configurable timer to vary the word line pulse width (timer not shown for simplicity) to accommodate the difference between read and write operations.

The memory columns 320(1)-320(p) may be coupled to the column mux 330. In some aspects, each of the memory columns 320(1)-320(p) may provide associated bit lines and select lines 321(1)-321(p) to the column mux 330. The bit lines may be used to read data from and/or write data to a selected RBM cell. The select line may be used to activate the associated memory column for read and/or write operations. The column mux 330 may couple a bit line from one of the memory columns 320(1)-320(p) to the sense amp 340. In some aspects, current may be supplied by the column bias circuits 310 to a selected memory column (e.g., the memory column coupled to the sense amp 340) instead of all of the memory columns 320(1)-320(p). In some embodiments, the column mux 330 may implement a number p of column select lines (which may include one or more bit lines) to select a corresponding memory column 320(1)-320(p) based on a column select line signal 355 provided by the controller 350. In some aspects, the column select line signal 355 may be a multi-bit signal based, at least in part, on the address lines 351.

The address lines 351 (via the column select line signal 355 and the word lines WL(1)-WL(q)), the read/write signal 352, and the enable signal 353 may determine operations of the memory array block 300. For example, the address lines 351 and the column select line signal 355 may determine (through the controller 350) which of the programmable current sources 311(1)-311(n) within the column bias circuits 310 is enabled and/or which of the memory column 320(1)-320(p) is coupled to the sense amp 340 through the column mux 330. In some aspects, the controller 350 may control the column bias circuits 310 through one or more signals included within a column bias control bus 312. The read/write signal 352 may be used to determine whether the operation is a read or write operation. As described above, for some RBM cells, writing different logic states may require different voltages and/or currents. Therefore, the controller 350 may configure the column bias circuits 310 to supply an appropriate voltage and/or current based on the read/write signal 352 and the input data $D_{IN}$.

The enable signal 353 may be used to control access to the memory array block 300. For example, the controller 350 may generate a sense amp enable signal 354 based on the read/write signal 352 and the enable signal 353. In some embodiments, the sense amp enable signal 354 may enable the sense amp 340 when data (e.g., a voltage) is available at the output of the column mux 330. Thus, the sense amp enable signal 354 may be generated in accordance with propagation delays associated with address decoding, with data delays through the memory columns 320(1)-320(p), and with data delays through the column mux 330.

The reference voltage generator 360 may generate a fine-tuned Reference voltage (Vref) used by the sense amp 340 to determine whether a logic 0 or logic 1 is read back from a selected RBM cell in a selected memory column. In some aspects, the band-gap reference 356, the bias generator 357, and/or the current source 358 within the controller 350 may generate the Vref Bias 359. In turn, the Vref Bias 359 may adjust (e.g., fine tune) the Vref generated by reference voltage generator 360. Thus, the Vref Bias 359 may adjust (e.g., increase or decrease) the fine-tuned reference voltage Vref provided to the sense amp 340. A coarse Vref may be supplied by the Column Mux 330, for example, when one or more of the memory columns 320(1)-320(p) is a dummy track block (sometimes referred to a dummy track column). Dummy track blocks are described in more detail below in conjunction with FIG. 6. The sense amp 340 may compare a voltage from the column mux 330 (and therefore from a bit line from a selected memory column and/or bit cell) and the fine-tuned reference voltage Vref to determine output data $D_{OUT}$. Thus, the output of the sense amp 340 may provide at least one output bit of a multi-bit signal including $D_{OUT}$. In some aspects, the calibration engine 371 may determine, at least in part, the fine-tuned reference voltage Vref. Operation of the calibration engine 371 is described in more detail below in conjunction with FIGS. 4-8.

As illustrated in the example memory array block 300, a single reference voltage generator 360 may be associated with the sense amp 340. Therefore, the reference voltage generator 360 may be associated with a group of memory columns (e.g., memory columns 320(1)-320(p)) within the memory array block 300. Other arrangements of reference voltage generators, memory columns and sense amps are contemplated.

In a first configuration, the memory array block 300 may include two or more sense amps (not shown for simplicity). The reference voltage generator 360 may then be coupled to the two or more sense amps and thereby enable the reference voltage generator 360 to be shared between the sense amps. The first configuration minimizes circuit area by including only one reference voltage generator 360 for each memory array block 300, with the trade-off that individual columns within the memory array block 300 may not be independently calibrated. In a second configuration, each of the two or more sense amps in the memory array block 300 may be coupled to a distinct reference voltage generator (not shown for simplicity), thereby enabling a unique reference voltage (Vref) to be generated for each sense amp 340. The second configuration may allow groups of columns within the memory array block 300 to be independently calibrated, although at the cost of increased circuit area (as compared with the first configuration). In a third configuration, a separate reference voltage generator may be associated with each memory column included within the memory array block 300 (not shown for simplicity). The third configuration may allow each of the columns in the memory array block 300 to be independently calibrated, although at the cost of increased circuit area (as compared with the first and second configurations).

The number and arrangement of reference voltage generators, memory columns, and/or sense amps may be determined through the user input 120. In this manner, when designing a memory array in accordance with the present embodiments, a user may configure the memory array to strike a desired balance between circuit area and the granularity with which columns of the memory array block 300 may be independently calibrated.

Figure 4A:
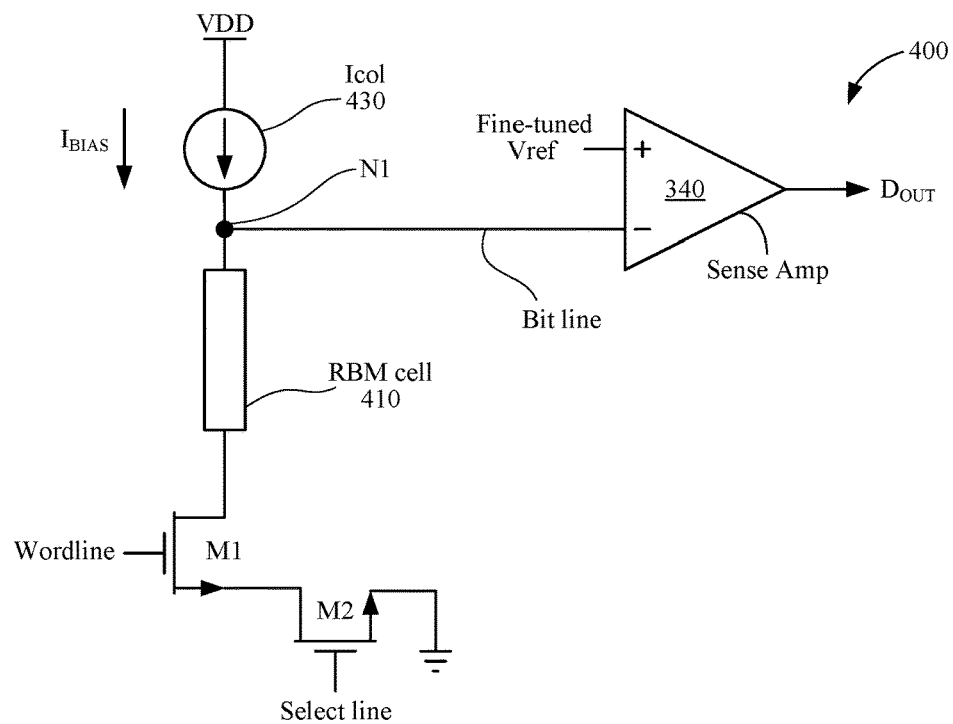
FIG. 4A is a simplified schematic diagram of a resistance-based memory cell that may be included within a column of the memory array block of FIG. 3.

FIG. 4A is a simplified schematic diagram 400 of a resistance-based memory (RBM) cell that may be included within one or more of memory columns 320(1)-320(p) of FIG. 3. The schematic diagram 400 includes an RBM cell 410, a column current source $I_{COL}$ 430, a word line FET M1, a select line FET M2, and an embodiment of the sense amp 340 of FIG. 3.

The column current source $I_{COL}$ 430 may provide a bias current $I_{BIAS}$ for an entire memory column such as, for example, one of memory columns 320(1)-320(p) depicted in FIG. 3. Although illustrated separately for ease of explanation, in some embodiments, the column current source $I_{COL}$ 430 may be included with the column bias circuits 310 of FIG. 3. The RBM cell 410, which may be included within a memory column 320(1)-320(p) of FIG. 3, receives the bias current $I_{BIAS}$ from the column current source $I_{COL}$ 430. As described above, the RBM cell 410 may exhibit a varying resistance based on whether a logic 0 or a logic 1 is stored within the RBM cell. Therefore, when the word line FET M1 and the select line FET M2 are both enabled, a voltage is generated at node N1 (e.g., a bit line associated with the RBM cell 410) based, at least in part, on the resistance of the RBM cell 410 and the bias current $I_{BIAS}$. The sense amp 340 compares the voltage of the bit line to the fine-tuned reference voltage Vref and determines whether the voltage of the bit line is representative of a logic 0 or a logic 1 (such as without deriving the resistance of the RBM cell 410 from the bit line voltage).

Figure 4B:
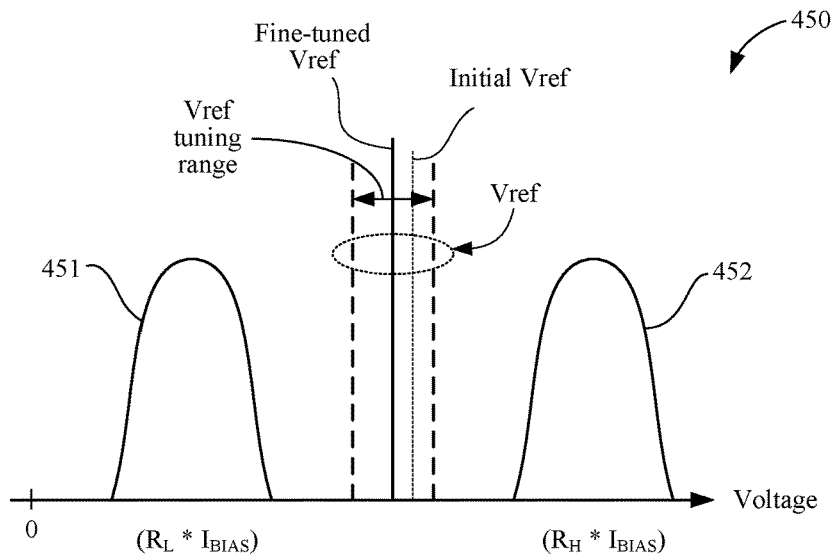
FIG. 4B is a graph depicting a relationship between voltages associated with a resistance value of a resistance-based memory cell and a reference voltage.

FIG. 4B is a graph 450 depicting a relationship between voltages associated with a resistance value of the RBM cell 410 and a reference voltage Vref. The RBM cell 410 may be a "binary" bit cell and may have a first resistance when storing a first logic state and a second resistance when storing a second logic state. For example, the RBM cell 410 may have a resistance of approximately 2000 ohms when storing a logic 0, and may have a resistance of approximately 4000 ohms when storing a logic 1. In another embodiment, the RBM cell 410 may have a resistance of approximately 2000 ohms when storing a logic 1, and may have a resistance of approximately 4000 ohms when storing a logic 0. In other embodiments, any suitable resistance value may represent any logic state or states.

As illustrated in FIG. 4A, the column current source $I_{COL}$ 430 may provide a bias current $I_{BIAS}$ to the RBM cell 410. Thus, a first resistance $R_L$ may provide a first voltage distribution 451 (e.g., $R_L*I_{BIAS}$) to represent a first logic state and a second resistance $R_H$ may provide a second voltage distribution 452 (e.g., $R_H*I_{BIAS}$) to represent a second logic state. The reference voltage Vref may be selected so that the first voltage distribution 451 is easily distinguished from the second voltage distribution 452. Thus, the stored logic states of the RBM cell 410 may also easily be distinguished. In some embodiments, the reference voltage Vref may be adjusted as part of a read calibration operation. For example, an initial (e.g., coarse) Vref may be used as a starting point (illustrated with a dotted line) and then fine-tuned within a Vref tuning range. In some aspects, the initial Vref may be determined and/or provided by a dummy track block. The dummy track block is described in more detail below in conjunction with FIGS. 5 and 6. The reference voltage Vref may be fine-tuned (illustrated with a solid line) via the Vref Bias 359 and/or the reference voltage generator 360. The read calibration operation is described in more detail below in conjunction with FIG. 8.

Figure 4C:
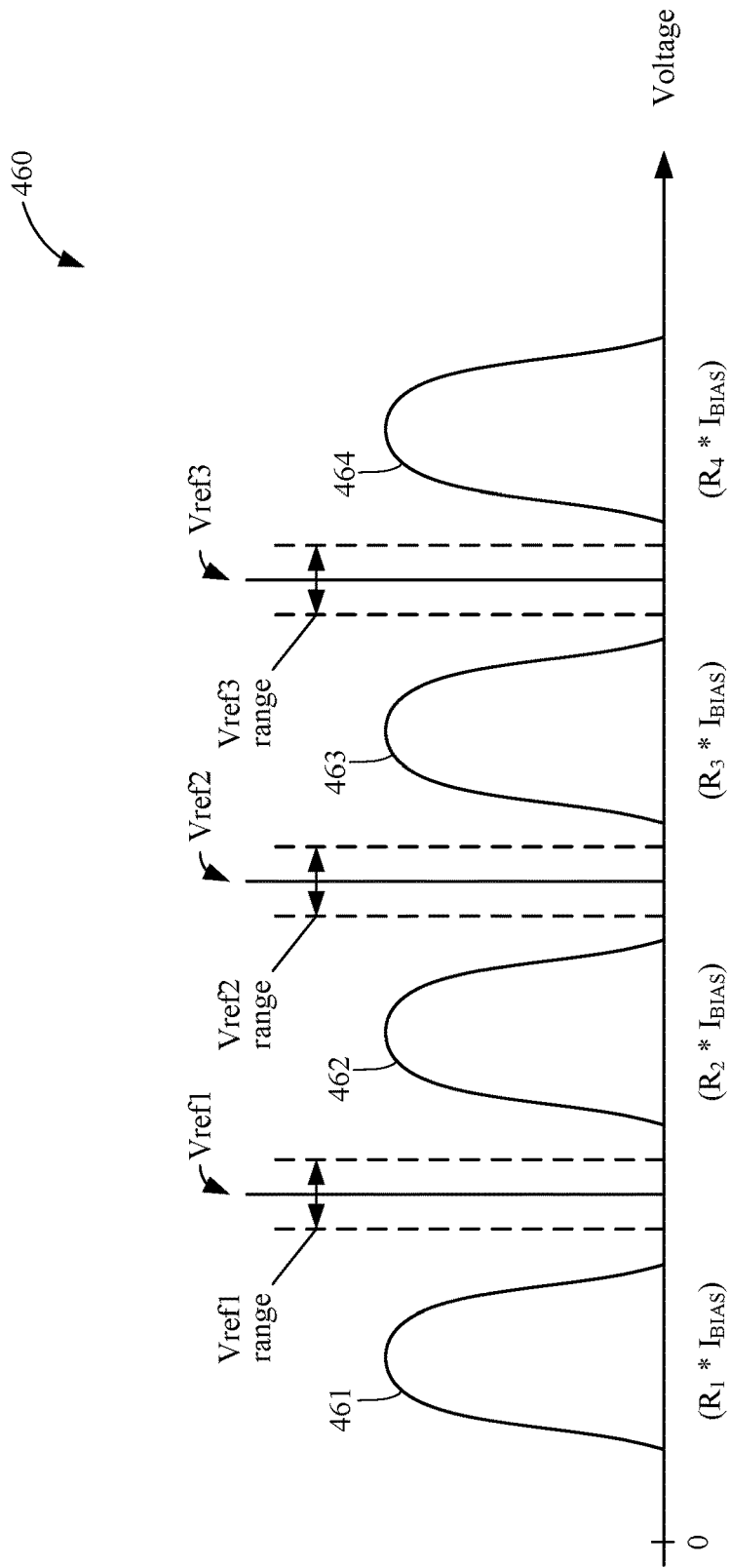
FIG. 4C is a graph depicting another relationship between voltages associated with resistance values of a resistance-based memory cell and a number of different reference voltages to store more than two logic states in the resistance-based memory cell.

FIG. 4C is a graph 460 depicting another relationship between voltages associated with resistance values of the RBM cell 410 and a number of different reference voltages to store more than two logic states in the RBM cell 410. For example, the RBM cell 410 may be a "multi-valued" bit cell and, therefore, be capable of providing multiple resistances indicative of multiple logic states of stored data. For example, four discrete resistances may represent four different logic states, where each logic state is associated with a unique bit pattern (e.g., 'b00, 'b01, 'b10, and 'b11). In other embodiments, any number of discrete resistances may represent other distinct logic states and bit patterns. A multi-valued RBM cell may offer increased memory density compared to a binary RBM cell.

The column current source $I_{COL}$ 430 may provide a bias current $I_{BIAS}$ to the RBM cell 410. In this example, the RBM cell 410 may provide one of four possible resistance values, R1, R2, R3, and R4. As a result, four different voltage distributions 461-464 are possible. To determine which voltage distribution is present, and therefore which logic state is stored in the RBM cell 410, three distinct reference voltages Vref1-Vref3 may be generated. Similar to as described above with respect to FIG. 4B, each Vref1-Vref3 may be adjusted (e.g., tuned) to more easily detect the distinct voltage distributions 461-464.

Figure 5:
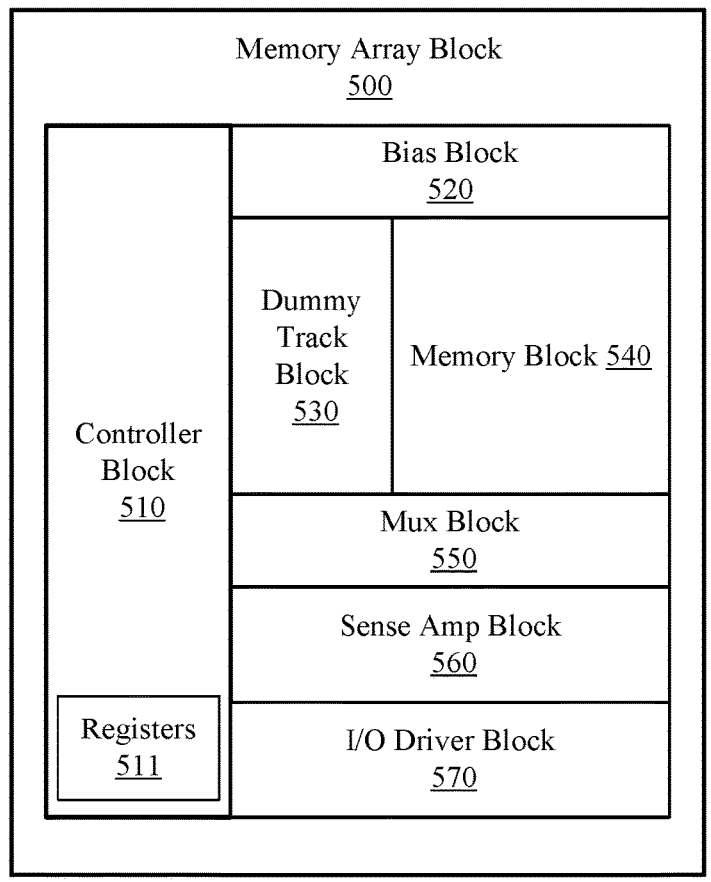
FIG. 5 depicts an example floorplan of a memory array block.

FIG. 5 depicts an example floorplan of a memory array block 500. The memory array block 500, which may be an embodiment of the memory array block 300 of FIG. 2 or the memory array blocks 210(1)-210(n) of FIG. 2, may include a controller block 510, a bias block 520, a dummy track block 530, a memory block 540, a mux block 550, a sense amp block 560, and an I/O driver block 570. The controller block 510 may be an embodiment of the controller 350 of FIG. 3. In some aspects, the controller block 510 may include circuits (not shown for simplicity) to perform a write and/or read calibration operation for the memory array block 500. Example write calibration operations are described in more detail below in conjunction with FIGS. 7A-7B. The controller block 510 may also include one or more registers 511 to configure and/or control the memory array block 500. For example, the registers 511 may include default register settings to control the band-gap reference voltage, one or more programmable current sources, one or more sense amps, and/or other suitable controls for circuits included within the memory array block 500.

The bias block 520 may include the band-gap reference voltage and a plurality of programmable current references (not shown for simplicity). For example, the bias block 520 may include a programmable current reference (similar to the column current source $I_{COL}$ 430 of FIG. 4A) for each memory column included in the dummy track block 530 and the memory block 540. The bias block 520 may also include one or more charge pumps (not shown for simplicity) to generate word line voltages for write operations associated with the memory block 540.

The memory block 540 may include a plurality of memory columns each including a plurality of RBM cells (memory columns and RBM cells not shown in FIG. 5 for simplicity). The dummy track block 530 may also include columns of RBM cells arranged in a similar manner to the RBM cells in the memory block 540. The RBM cells in the dummy track block 530 may be used to determine timing information and/or to calibrate read/write operations, for example, by providing a coarse reference voltage and/or current for one or more sense amplifiers. The dummy track block 530 is described in more detail below in conjunction with FIG. 6.

The mux block 550 may include a plurality of column multiplexers (which may include the column mux 330 of FIG. 3) and the sense amp block 560 may include a plurality of sense amps (such as the sense amp 340 of FIG. 3). The I/O driver block 570 may include drivers and/or amplifiers (not shown for simplicity) to amplify the output data $D_{OUT}$.

Figure 6:
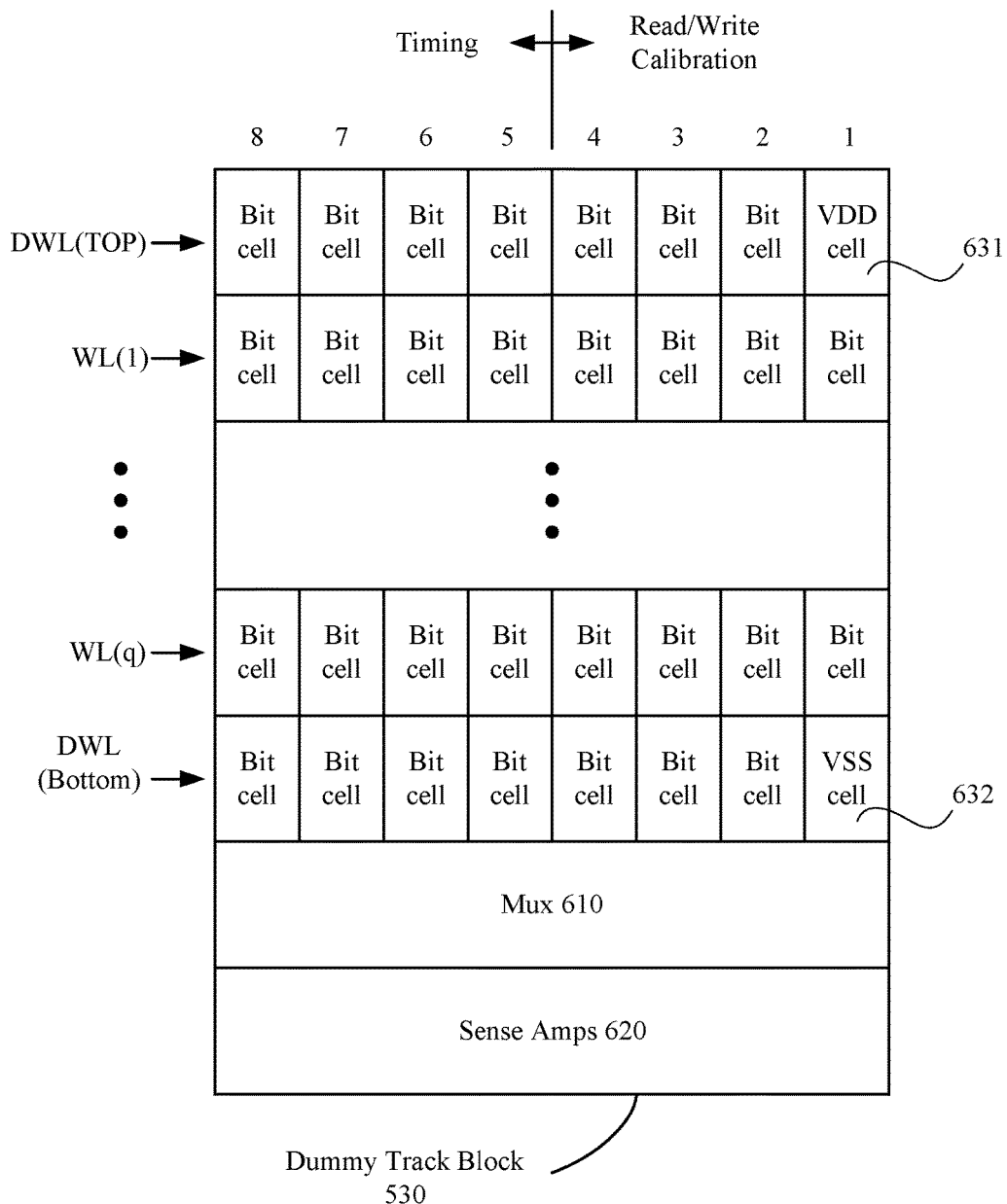
FIG. 6 is block diagram of an example dummy track block of FIG. 5.

FIG. 6 is block diagram of an example dummy track block 530. The dummy track block 530 may be used to determine timing information, reference voltages and/or reference currents for the memory block 540 of FIG. 5. As shown, the dummy track block 530 includes eight (vertical) columns of RBM cells, a mux block 610 and a sense amp block 620. In some embodiments, the mux block 610 may be included within the mux block 550 of FIG. 5, and the sense amp block 620 may be included within sense amp block 560 of FIG. 5. Although the dummy track block 530 includes eight columns, in other embodiments, the dummy track block 530 may include any suitable number of columns. The RBM cells (which may be an embodiment of the RBM cell 410 of FIG. 4) may be coupled to each other within each column. For example, the RBM cells within a column may be coupled vertically via a common select line and/or bit line (not shown for simplicity), through a column mux (in the mux block 610), and to a sense amp (in the sense amp block 620). The RBM cells may also be coupled to each other within a common row (e.g., horizontally) via a word line. In the example of FIG. 6, the dummy track block 530 includes q word lines WL(1)-WL(q) and two dummy word lines DWL (top) and DWL (bottom). In this manner, any one of the bit cells in the dummy track block 530 may be individually accessed through distinct combination of word lines and select lines. In other embodiments, the dummy track block 530 may include other numbers of word lines, dummy word lines and/or select lines.

In some aspects, some of the columns of the dummy track block 530 may be used to determine timing information related to reading and/or writing data into the memory block 540. Other columns may be used to calibrate read/write operations for the memory block 540. As shown in the example dummy track block 530, columns 1-4 may be used to calibrate read/write operations and columns 5-7 may be used determine timing information. In other embodiments, other numbers of columns and/or different columns, may be used to determine timing information and/or read/write calibration.

For read/write calibration, the dummy track block 530 may be used to determine (e.g., tune) an effective reference voltage Vref for the sense amps within the sense amp block 560 and/or the sense amp block 620. Some of the columns of the dummy track block 530 may be used to determine a coarse reference voltage Vref. For example, a first RBM cell coupled to a first dummy word line (e.g., DWL (top)) may be replaced with application specific bit cell 631 coupled to VDD, and a second RBM cell coupled to a second dummy word line (e.g., DWL (bottom)) may be replaced with an application specific bit cell 632 coupled to VSS. By activating the first dummy word line and the second dummy word line, the application specific bit cells 631-632 may form a voltage divider between VDD and VSS and generate an initial reference voltage Vref equivalent to VDD/2. In some embodiments, different columns within the dummy track block 530 may use different application specific bit cells (not shown for simplicity) to generate different initial (e.g., coarse) reference voltages. For example, column 1 may generate a first reference voltage Vref1, while column 2 generates a second reference voltage Vref2 that is slightly higher or lower than the first reference voltage Vref1. Thus, in the example dummy track block 530 columns 1-4 may be configured to generate four different reference voltages Vref1-Vref4. During a calibration operation, one of the four reference voltages Vref1-Vref4 may be selected as the initial reference voltage Vref. The reference voltage Vref may then be fine-tuned by adjusting one or more parameters and iteratively testing the modified reference voltage by reading known RBM cells.

The dummy track block 530 may also be used to determine timing information. For example, one of the columns (e.g., one or more of columns 5-8) may be selected by a column mux 330 within the mux block 610. When an RBM cell is selected via one of the word lines (e.g., DWL (top), DWL (bottom), or one of WL(1)-WL(q)), the output of the selected RBM cell may be used to determine the sense amp enable signal 354. In other words, the dummy track block 530 may determine, at least in part, when a sense amp should be enabled based on one or more word lines and select lines. Thus, timing information associated with word line/select line decoding and propagation may be determined via the dummy track block 530 enabling the sense amp 340 within the sense amp block 620 or sense amp block 560 at an appropriate time.

Figure 7A:
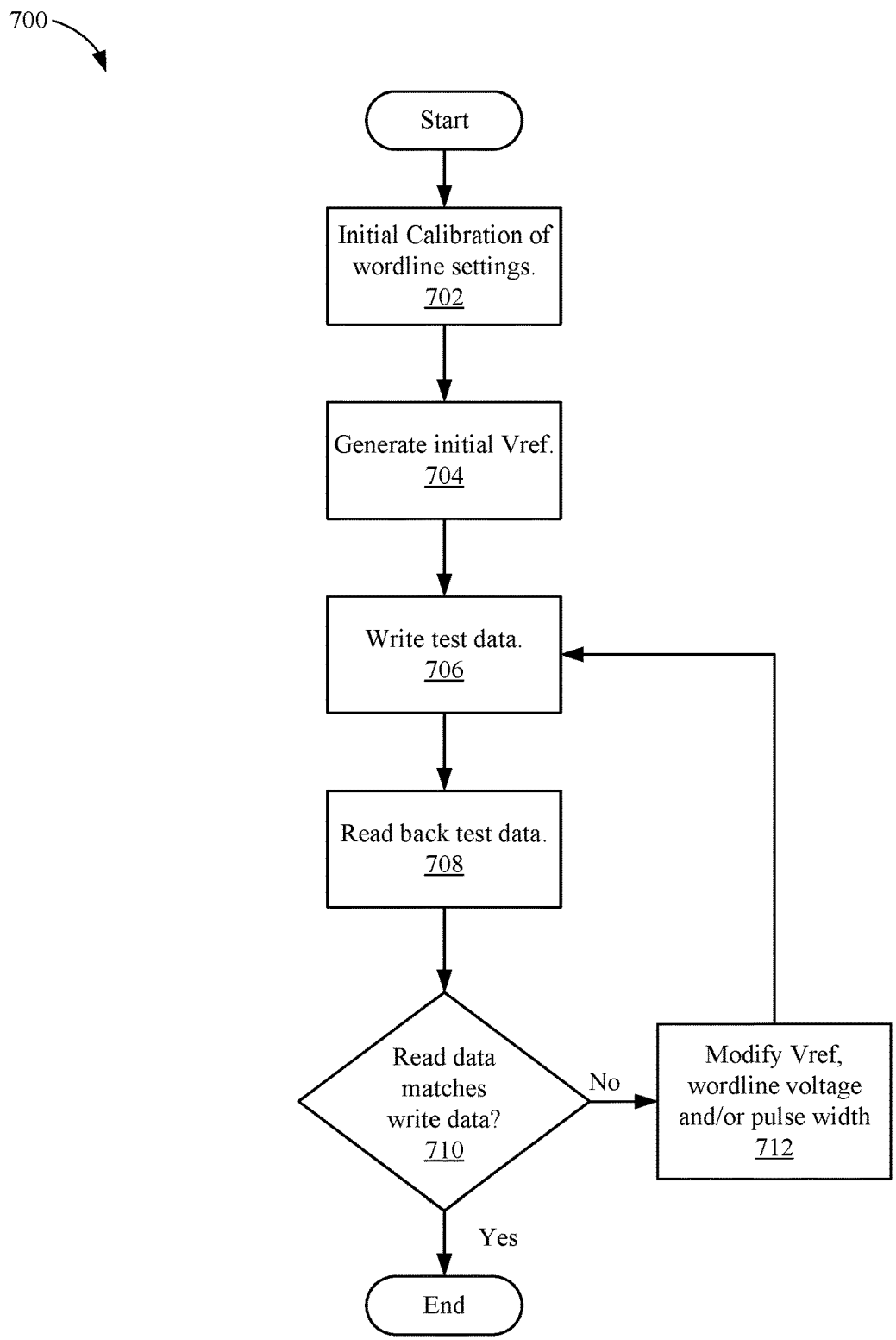
FIG. 7A shows a flowchart depicting an example write calibration operation for the memory block of FIG. 5.

FIG. 7A shows a flowchart depicting an example write calibration operation 700 for the memory block 540. The write calibration operation 700 may be performed by hardware (which may include one or more application specific state machines), software (which may include one or more processors executing instructions stored in a non-transitory computer-readable medium), and/or a combination of both hardware and software. Some embodiments may perform the operations described herein with additional operations, fewer operations, operations in a different order, operations in parallel, and/or some operations differently. Furthermore, in some embodiments, the resistance-based memory compiler 110 may generate output files to instantiate hardware, firmware, and/or software to perform some or all of the write calibration operation 700.

Referring also to FIGS. 3 and 5, the controller 350 performs an initial calibration of word line settings (702). For example, the controller 350 may determine initial write word line voltage settings and write word line pulse widths. In some aspects, the initial write word line voltage and/or write word line pulse width may be determined by one or more default register settings included with the registers 511. The word line voltage may be generated by a charge pump included with the bias block 520 or any suitable region adjacent to the memory block 540. The word line pulse width may be determined by a timer included in the controller 350.

Next, the controller 350 generates an initial (e.g. coarse) reference voltage Vref (704). In some aspects, the controller 350 may enable one or more dummy word lines (in contrast to regular word lines) to activate application specific bit cells within the dummy track block 530 to create a voltage divider between VDD and VSS reference voltages. Thus, a resulting reference voltage Vref may be midway between VDD and VSS. The reference voltage Vref may be provided to the sense amp 340 and/or the sense amp block 560.

Next, the controller 350 writes test data using one or more selected bit cells (706). For example, using the initial write word line voltage and pulse width settings (determined at 702), the controller 350 may write a logic 0 and/or a logic 1 into one or more selected RBM cells. The selected RBM cells may be in the memory block 540 or the dummy track block 530. Next, the controller 350 reads data stored in the one or more selected RBM cells (708). In some aspects, the test data is read using the reference voltage Vref (determined at 704) and the sense amps, for example, as described above. If the data read from the one or more selected RBM cells matches the data written to the selected RBM cells (710), then the operation ends.

Conversely, if the data read from the one or more selected RBM cells does not match the data written to the selected RBM cells, then the controller 350 adjusts or modifies the reference voltage Vref, the write word line voltage and/or the write word line pulse width (712). In a first example, a different reference voltage Vref may be provided via a different column within the dummy track block 530. In a second example, the write word line voltage may be increased (for example, by changing one or more settings controlling a charge pump that generates the write word line voltage) and/or the write word line pulse width may be increased (for example, by changing a timer setting that controls a pulse width of the write word line).

The operation returns to 706. In this manner, an initial reference voltage Vref, and operational write word line voltage and pulse width may be determined. In some aspects, the initial write word line voltage and write word line pulse widths (determined from default register settings) may be relative minimums. Thus, the write calibration operation 700 may iteratively increase write word line voltage and/or pulse width until data is successfully written and verified within one or more selected bit cells.

Figure 7B:
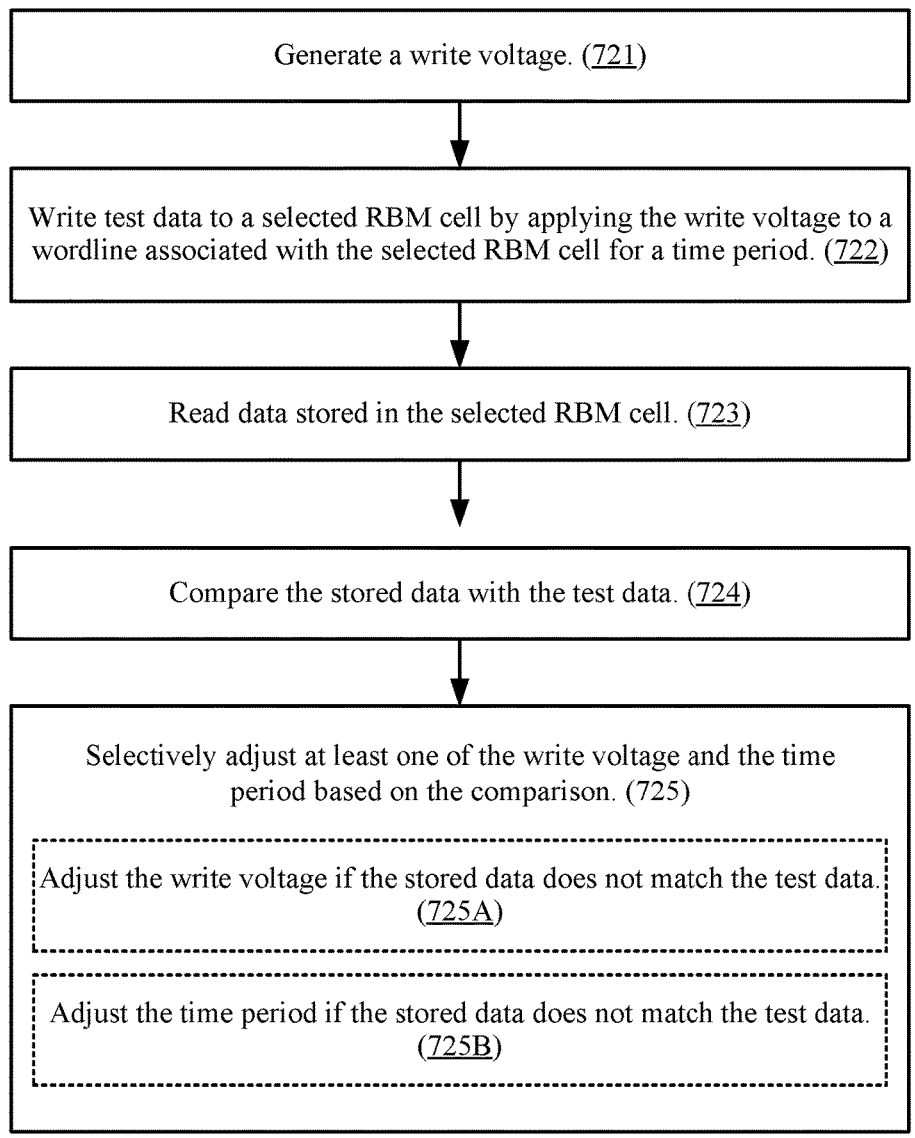
FIG. 7B shows a flowchart depicting another example write calibration operation for the memory block of FIG. 5.

FIG. 7B shows a flowchart depicting another example write calibration operation 720 for the memory block of FIG. 5. The write calibration operation 720 may be performed by hardware (which may include one or more application specific state machines), software (which may include one or more processors executing instructions stored in a non-transitory computer-readable medium), and/or a combination of both hardware and software. Some embodiments may perform the operations described herein with additional operations, fewer operations, operations in a different order, operations in parallel, and/or some operations differently. Furthermore, in some embodiments, the resistance-based memory compiler 110 may generate output files to instantiate hardware, firmware, and/or software to perform some or all of the write calibration operation 720.

Referring also to FIGS. 3 and 5, the controller 350 generates a write voltage (721). For example, the controller 350 may determine the write voltage, and may determine a time period (such as a write word line pulse width) for which the write voltage is to be applied to an associated word line for a write operation to a selected one of the RBM cells of the memory block 540. In some aspects, the initial write voltage and/or write word line pulse width may be determined by one or more default register settings included with the registers 511. The write voltage may be generated by a charge pump included with the bias block 520 or any suitable region adjacent to the memory block 540. The word line pulse width—or the determined time period—may be determined by a timer included in the controller 350.

In addition, or in the alternative, the controller 350 may enable one or more dummy word lines (in contrast to regular word lines) to activate application specific bit cells within the dummy track block 530 to create a voltage divider between VDD and VSS reference voltages. Thus, a resulting reference voltage Vref may be midway between VDD and VSS. The reference voltage Vref may be provided to the sense amp 340 and/or the sense amp block 560.

Next, the controller 350 writes a first test data to a selected RBM cell by applying the initial write voltage to a word line associated with the selected RBM cell for a time period (722). For example, using the initial write voltage and pulse width settings (determined at 721), the controller 350 may write a logic 0 and/or a logic 1 into the selected RBM cell. The selected RBM cell may be in the memory block 540 or the dummy track block 530.

Next, the controller 350 reads data stored in the selected RBM cell (723). In some aspects, the test data is read using the reference voltage Vref and the sense amps as described above. The controller 350 compares the stored data with the first test data (724), and selectively adjusts at least one of the write voltage and the time period based on the comparison (725). In some implementations, the controller 350 may adjust the write voltage if the stored data does not match the first test data (e.g., if the data written to the selected RBM cell does not match the data read from the selected RBM cell (725A), may adjust the time period if the stored data does not match the first test data (e.g., if the data written to the selected RBM cell does not match the data read from the selected RBM cell (725B), or both.

In some aspects, the controller 350 may adjust the reference voltage Vref, the write word line voltage, and/or the write word line pulse width. In a first example, a different reference voltage Vref may be provided via a different column within the dummy track block 530. In a second example, the write word line voltage may be increased (for example, by changing one or more settings controlling a charge pump that generates the write word line voltage) and/or the write word line pulse width may be increased (for example, by changing a timer setting that controls a pulse width of the write word line). Conversely, if the stored data matches the first test data, then the operation 720 ends.

Figure 8:
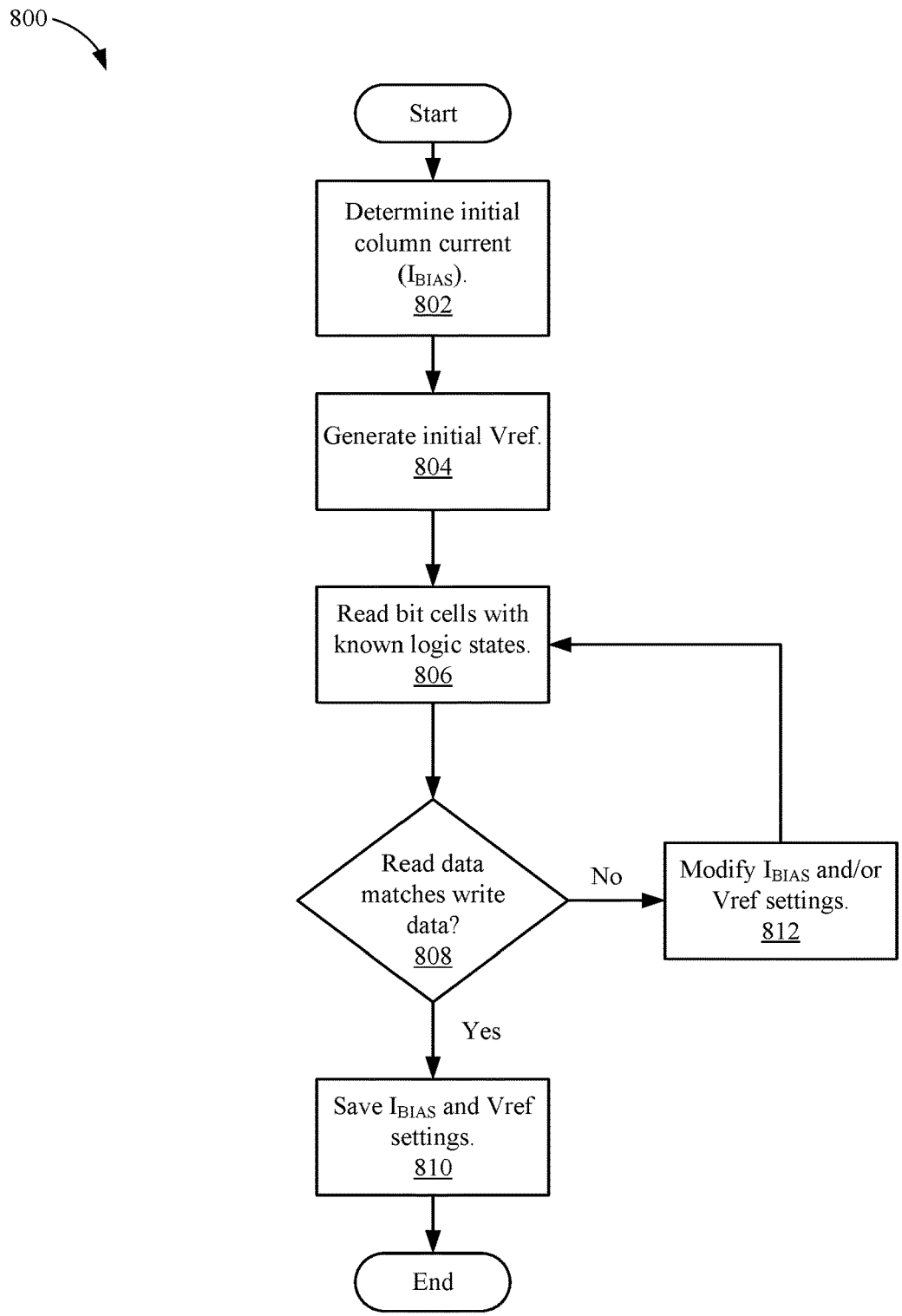
FIG. 8 shows a flowchart depicting an example read calibration operation for the memory block of FIG. 5.

FIG. 8 shows a flowchart depicting an example read calibration operation 800 for the memory block 540. The read calibration operation 800 may fine tune the reference voltage Vref, and/or the column current $I_{BIAS}$ provided by the column current source $I_{COL}$ 430 used to bias one or more RBM cells. In some embodiments, the resistance-based memory compiler 110 may generate output files to instantiate hardware, firmware, and/or software to perform some or all of the read calibration operation 800. Referring also to FIGS. 3 and 5, the controller 350 determines an initial column current $I_{BIAS}$ (802). In some aspects, the initial column current $I_{BIAS}$ may be determined by a default register setting as described above. Next, the controller 350 generates an initial (e.g., coarse) reference voltage Vref (804). In some aspects, the controller 350 may enable one or more word lines to activate application specific bit cells to create a voltage divider between VDD and VSS reference voltages. Thus, the resulting reference voltage Vref may be midway between VDD and VSS. The reference voltage Vref may be provided to the sense amp 340 and/or the sense amp block 560.

Next, the controller 350 reads one or more RBM cells with known resistances (806). In some aspects, the controller 350 may select RBM cells involved with a write calibration operation 700 performed earlier. If the data read back from the one or more selected bit cells matches the data written to the selected bit cells (808), then the controller 350 saves the $I_{BIAS}$ and Vref settings and applies them to the memory block 540 (810) and the operation ends. On the other hand, if the data read back does not match the data written to the selected bit cells, then the controller 350 modifies the column current $I_{BIAS}$ and/or the reference voltage Vref (812). In some aspects, the reference voltage Vref may be adjusted by a biasing transistor configured to increase and/or decrease current within the voltage divider (formed in 804). In some other aspects, the reference voltage Vref may be adjusted by modifying the Vref Bias 359 and/or settings of the reference voltage generator 360. The column current $I_{BIAS}$ may be adjusted through one or more controllable current sources (e.g., column current source $I_{COL}$ 430). The operation returns to 806.

Figure 9:
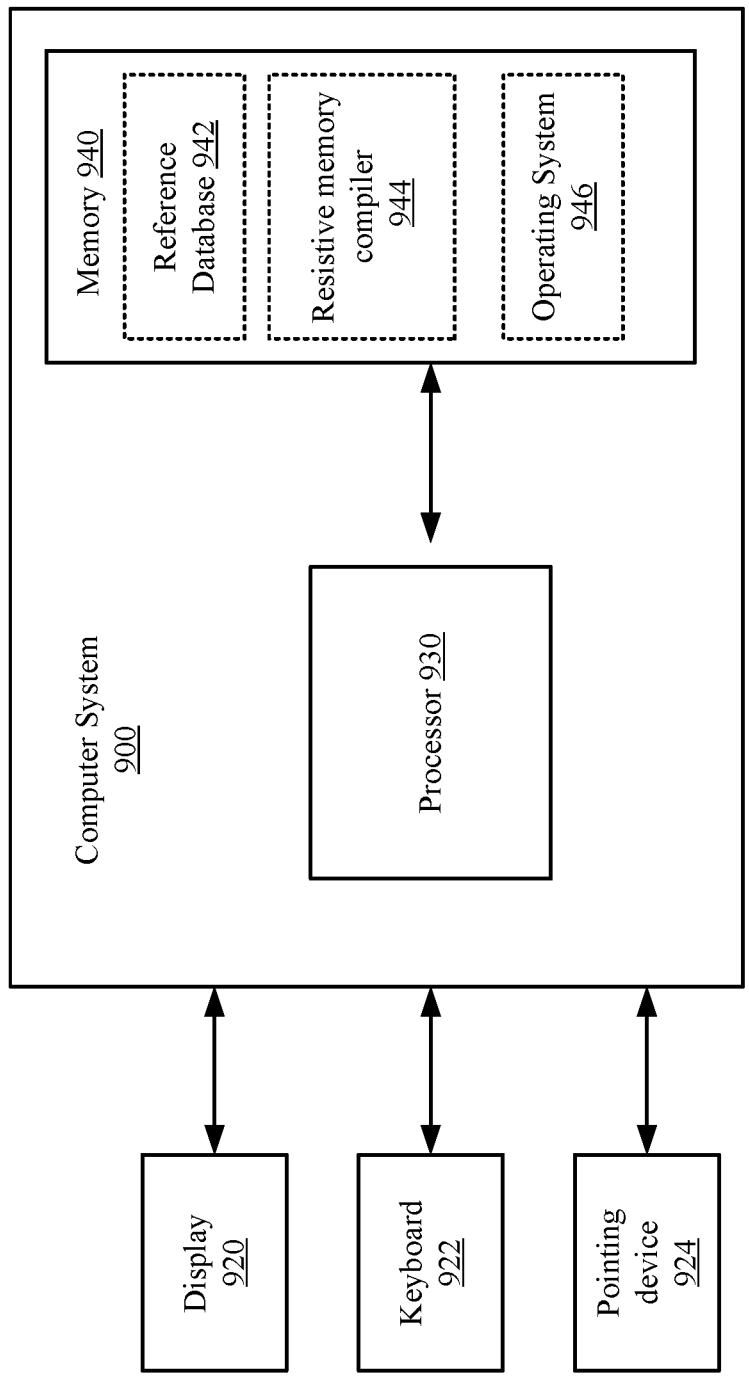
FIG. 9 shows a computer system in accordance with some embodiments described herein.

FIG. 9 shows a computer system 900 in accordance with some embodiments described herein. The computer system 900 may include a processor 930 and a memory 940. The processor 930, which is coupled to the memory 940, may be any one or more suitable processors capable of executing scripts or instructions of one or more software programs stored within the computer system 900 (e.g., within the memory 940).

The computer system 900 may be coupled to a display 920, a keyboard 922, and a pointing device 924. The memory 940 may be a solid state, magnetic, optical, magneto-optical, or any other suitable device capable of transient and/or non-volatile storage. The memory 940 may store a reference database 942. The reference database 942 may be an embodiment of the reference database 112 of FIG. 1 and may include design information associated one or more resistance-based memory arrays. Further, memory 940 may also include a non-transitory computer-readable storage medium (e.g., one or more nonvolatile memory elements, such as EPROM, EEPROM, Flash memory, a hard drive, etc.) that may include a resistance-based memory compiler 944 and/or an operating system 946.

The processor 930 may execute the operating system 946 to manage computer system 900 hardware and provide services for execution of one or more computer programs.

The resistance-based memory compiler 944 may be an embodiment of the resistance-based memory compiler 110 of FIG. 1. The processor 930 may execute the resistance-based memory compiler 944 to generate one or more output files associated with a resistance-based memory array. The output files may include RTL files and/or database files to instantiate the resistance-based memory array within a hierarchal or other suitable design. In addition, the output files may also include RTL and/or database files that provide and/or implement the functionality described in conjunction with the write calibration operation 700 of FIG. 7 and/or the read calibration operation 800 of FIG. 8.

The processor 930 may be responsible for managing the bus and general processing, including the execution of software stored on machine-readable media (e.g., within the memory 940). The processor 930 may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product, all which may be accessed by the processor through the bus interface. Alternatively, or in addition, the machine-readable media, or any portion thereof, may be integrated into the processor, such as the case may be with cache and/or general register files.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The bus may also link various other circuits such as timing sources, peripherals, voltage regulators, power management circuits, and the like, which are well known in the art, and therefore, will not be described any further.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A non-transitory computer-readable storage medium storing instructions that, when executed by one or more processors of a computer system, cause the computer system to generate, based on user input, one or more netlist files for configuring a memory array by performing a number of operations comprising:
    providing a memory block including a controller, a number of reference voltage generators, a number of sense amplifiers, and a number of memory columns each including a plurality of resistance-based memory (RBM) cells;
    selecting the number of reference voltage generators to include in the memory block based on the user input;
    selecting the number of sense amplifiers to include in the memory block based on the user input; and
    determining how many of the sense amplifiers are to be coupled to each of the reference voltage generators based on the user input.

2. The non-transitory computer-readable storage medium of claim 1, wherein execution of the instructions for determining how many of the sense amplifiers are to be coupled to each of the reference voltage generators causes the computer system to perform operations further comprising:
    selecting, for a respective one of the reference voltage generators, a corresponding number of the memory columns to share the respective reference voltage generator.

3. The non-transitory computer-readable storage medium of claim 1, wherein:
    a first netlist file configuration provides a single reference voltage generator for all the sense amplifiers in the memory block;
    a second netlist file configuration provides a different reference voltage generator for a selected number of the sense amplifiers in the memory block; and
    a third netlist file configuration provides a dedicated reference voltage generator for each of the sense amplifiers in the memory block.

4. The non-transitory computer-readable storage medium of claim 1, wherein execution of the instructions causes the computer system to perform operations further comprising:
    providing a column bias circuit for the memory block;
    selecting a number of programmable current sources to include in the column bias circuit based on the user input; and
    determining how many of the memory columns are to be coupled to each of the programmable current sources based on the user input.

5. The non-transitory computer-readable storage medium of claim 4, wherein:
    a first netlist file configuration provides a single programmable current source for all the memory columns in the memory block;
    a second netlist file configuration provides a different programmable current source for a selected number of the memory columns in the memory block; and
    a third netlist file configuration provides a dedicated programmable current source for each of the memory columns in the memory block.

6. The non-transitory computer-readable storage medium of claim 1, wherein execution of the instructions causes the computer system to perform operations further comprising:
    providing a dual-purpose dummy track block in the memory block, the dual-purpose dummy track block including a number of columns each including a plurality of dummy RBM cells.

7. The non-transitory computer-readable storage medium of claim 6, wherein the dual-purpose dummy track block is configured to determine timing information for read and write operations of the memory array.

8. The non-transitory computer-readable storage medium of claim 6, wherein the dual-purpose dummy track block is configured to determine a course reference voltage for the memory array.

9. The non-transitory computer-readable storage medium of claim 6, wherein a first of the plurality of dummy RBM cells in a selected column of the dual-purpose dummy track block comprises a first application specific bit cell coupled to be coupled to a first supply voltage, and a second of the plurality of dummy RBM cells in the selected column of the dual-purpose dummy track block comprises a second application specific bit cell coupled to be coupled to a second supply voltage different than the first voltage supply.

10. The non-transitory computer-readable storage medium of claim 9, wherein the first application specific bit cell is configured to generate a first reference voltage, and the second application specific bit cell is configured to generate a second reference voltage different than the first reference voltage.

11. The non-transitory computer-readable storage medium of claim 10, wherein the first and second reference voltages are configured to determine a logic state of a multi-valued RBM cell in the memory array.

12. The non-transitory computer-readable storage medium of claim 1, wherein the controller is configured to adjust a write voltage for write operations based on a comparison between test data stored in a selected RBM cell and data read from the selected RBM cell.

13. The non-transitory computer-readable storage medium of claim 1, wherein the controller is configured to adjust a reference voltage for read operations based on a comparison between test data stored in a selected RBM cell and known data.

* * * * *